W. NEWCOMB.
Improvement in Tackle-Hooks.
No. 116,212.
Patented June 20, 1871.
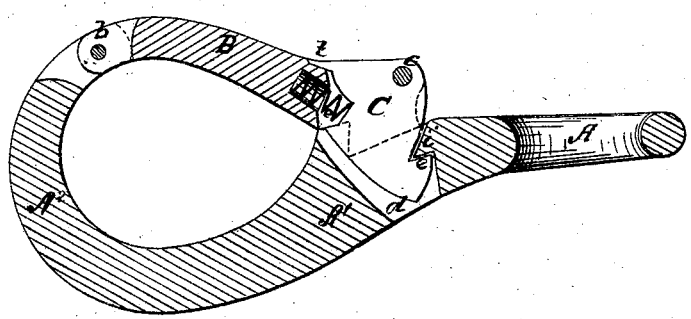
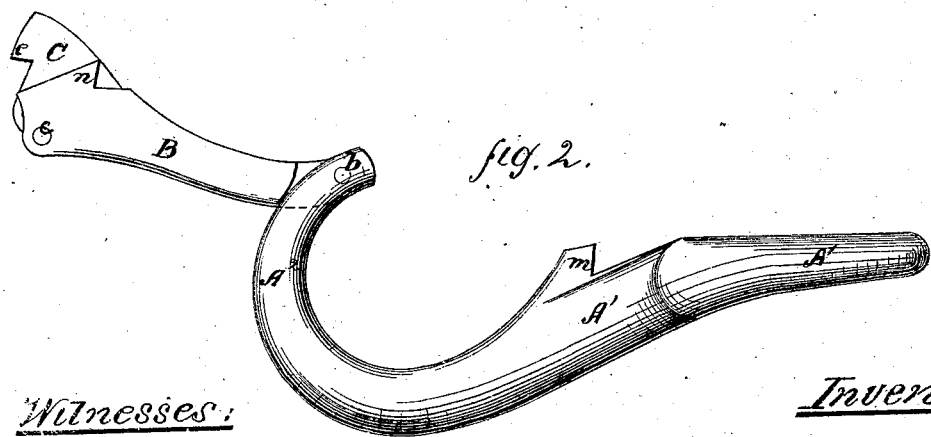

UNITED STATES PATENT OFFICE.

WILSON NEWCOMB, OF BALTIMORE, MARYLAND.

IMPROVEMENT IN TACKLE-HOOKS.

Specification forming part of Letters Patent No. 116,212, dated June 20, 1871.

*To all whom it may concern:*

Be it known that I, WILSON NEWCOMB, of the city and county of Baltimore, State of Maryland, have invented an Improved Tackle-Hook; and I do hereby declare the following to be a full, clear, and exact description of the same, reference being had to the accompanying drawing forming part of this specification, in which—

Figure 1 is a longitudinal section of my improved tackle-hook, and Fig. 2 is a side view of the same opened.

Similar letters of reference in the drawing denote corresponding parts.

My invention has for its object to improve that class of hooks used upon vessels, &c., and known as tackle-hooks, in which a hinged tongue is employed. In hooks of this character it is usual to so apply the tongue as to simply close one side of the hook to prevent the casual escape of a rope or other device to which the hook is engaged, and not to form an additional strengthening-arm for the purpose of sustaining additional weight or strain. My invention consists principally in a hook whose point is so connected to the main shank by a hinged tongue that it shall not only close the open side of the hook, but form an additional arm or side to increase its strength, and so that the strain shall be distributed from the eye of the hook equally through both sides. It also consists in a peculiarly-constructed locking device, in which the parts are so arranged that the bolt or latch is guarded, so that when the hook is in use there is hardly a possibility of any objects coming in contact with it in such a manner as to unlock the fastening and liberate the end of the arm.

In the drawing, A indicates the eye of the hook; $A^1$, the shank; and $A^2$, the bent fixed arm or side which sustains the greater part of the weight. B indicates another arm or side, made as nearly symmetrical with the arm $A^2$ as possible, and articulated thereto by a pin, slot, and tongue, at $b$, so as to close down against the shank $A^1$ and lock thereto, as shown in Fig. 1, forming a closed hook, somewhat resembling a "sister-hook;" or, on the other hand, to open out almost in line with the eye A, as shown in Fig. 2, the edges of the slot and tongue being cut away so as to allow the part B to open to the fullest extent necessary, so that its extremity will not be continually catching into everything that it comes in contact with, but will rather operate as a guard to prevent the part $A^2$ from thus catching into things. The locking end of the part B is somewhat enlarged to increase its strength, and to enable the locking apparatus within to be made larger and stronger, and it is provided with a deep open slot to receive and hold the locking-plate, latch, or bolt, C, which is articulated to the part B by means of a pin, $c$, passing through the lugs on such side of the slot. The shank $A^1$ is provided with a slot, $d$, which extends entirely through, for the purpose of admitting the end of the latch C, and allowing its hook $e$ to lock over a shoulder, $i$, formed upon the part $A^1$ within the slot. The shank is also provided with a strong shoulder, $m$, so constructed and arranged that a hook, $n$, on the inner edge of each lug, at the end of the arm B, will fit accurately over it when said arm is closed, and thereby assist materially in supporting the weight of the tackle and its connections. The manner in which these shoulders interlock with each other is shown clearly by the dotted lines in Fig. 1. When the parts are properly made and accurately fitted the joint thus formed will be close, and the connection so strong as to relieve the pivot $b$ of nearly all strain. The plate or latch C is held in position by a spiral spring, $o$, or its equivalent, and its end is so beveled that as it comes down against the edge of the slot it will be pressed back till its hook passes over the shoulder $i$, when the spring $o$ will snap it down over said shoulder and securely lock the arm in that position, as shown in Fig. 1. When thus locked there is only one little point upon the latch-plate C which can possibly come in contact with anything to unlock it, and that point is in the acute angle between the end of the part B and the face of the shank $A^1$. Here, however, it is guarded by the projecting lugs, and by the fact of its being situated in an angular recess, which only very small objects can enter; and, besides this, the rope, thimble, hook, or other device connected to the eye A projects out over it and serves as an additional safeguard, so that the danger of casual unlocking is entirely obviated. A little toe or stop, $t$, may be formed on the back of the latch-plate, for the purpose of preventing the spring from throwing its notched end out too far.

The device is self-locking, and when necessary to unlock it the operation can be instantly and easily performed by inserting the end of the thumb or finger into the angular recess at the end of the pivoted arm and pressing inward upon the latch-plate. None of the parts bind under any circumstances, when properly constructed; but they can be connected or disconnected and operated, as may be desired, as easily under a heavy weight as without any weight at all. The lock formed by the parts m n, for example, although so close and strong, does not bind so as to prevent the arm from opening freely, whatever be the weight supported by the hook at the time, an effect which is produced by the arrangement of the pivot b in such relation to the shoulders that, as the arm is swung out upon its pivot, the shoulder n at first rises so as to clear the shoulder m, and then moves out away from it. In locking the action of these parts is, of course, reversed, the shoulder n moves in toward the shoulder m, and then settles down upon it, forming a firm and close joint, as above described.

This locking-hook is very easily and cheaply constructed, of brass, malleable or wrought iron, or other suitable metal, and it may be used for various purposes, both on land and water, which it is hardly necessary here to specify.

Having thus described my invention, what I claim as new therein, and desire to secure by Letters Patent, is—

1. A tackle-hook, provided with a hinged arm adapted to connect the point to the shank, for the purpose of forming a continuous loop, both sides of which support the strain applied to the shank, substantially as and for the purpose specified.

2. A tackle-hook, having its hinged arm adapted to engage with the main shank by means of reversed shoulders m n, substantially as described, for the purpose specified.

3. In combination with the hinged and shouldered arm B and the shouldered shank $A^1$, the spring-catch C, substantially as described, for the purpose specified.

WILSON NEWCOMB.

Witnesses:
NATHAN K. ELLSWORTH,
A. C. RAWLINGS.